(12) United States Patent
Beppu (10) Patent No.: US 11,053,083 B2
(45) Date of Patent: Jul. 6, 2021

(54) TRANSPORT DEVICE

(71) Applicant: Azbil Corporation, Tokyo (JP)

(72) Inventor: Hisashi Beppu, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/046,570

(22) PCT Filed: Apr. 13, 2018

(86) PCT No.: PCT/JP2018/015618
§ 371 (c)(1),
(2) Date: Oct. 9, 2020

(87) PCT Pub. No.: WO2019/198244
PCT Pub. Date: Oct. 17, 2019

(65) Prior Publication Data
US 2021/0130106 A1    May 6, 2021

(51) Int. Cl.
*B65G 47/08* (2006.01)
*B65G 15/46* (2006.01)
*B65G 47/82* (2006.01)
*B65G 21/20* (2006.01)

(52) U.S. Cl.
CPC ........... *B65G 47/088* (2013.01); *B65G 15/46* (2013.01); *B65G 21/20* (2013.01); *B65G 47/82* (2013.01); *B65G 2201/0235* (2013.01)

(58) Field of Classification Search
CPC ........ B65G 47/53; B65G 15/42; B65G 21/12; B65G 47/08; B65G 47/14; B65G 47/82; B65G 47/082; B65G 47/5127; B65G 47/088

USPC ......................................................... 198/429
See application file for complete search history.

(56) References Cited

U.S. PATENT DOCUMENTS

| 2009/0208320 | A1 | 8/2009 | Wagner et al. | |
| 2012/0279828 | A1 | 11/2012 | Eschlbeck | |
| 2015/0034252 | A1* | 2/2015 | Stuhlmann | B65B 17/02 156/566 |
| 2015/0090404 | A1* | 4/2015 | Van Wickeren | B65B 21/06 156/556 |
| 2016/0304291 | A1 | 10/2016 | Strauch et al. | |

(Continued)

FOREIGN PATENT DOCUMENTS

| EP | 1 717 533 B1 | 7/2013 |
| JP | H01-180422 U | 12/1989 |

(Continued)

OTHER PUBLICATIONS

International Search Report received for PCT Patent Application No. PCT/JP2018/015618, dated May 29, 2018, 4 pages (2 pages of English Translation of International Search Report and 2 pages of International Search Report).

*Primary Examiner* — James R Bidwell (57) ABSTRACT

A transport device having a plate; an unloading device which pushes a plurality of articles arranged on the plate; a bridge disposed adjacent to the plate; and a conveyor belt which is disposed adjacent to the bridge and which transports a row of articles having been pushed out from the plate. After a predetermined row of articles is pushed out from the bridge onto the belt conveyor, the belt conveyor moves in the same direction as the direction in which the unloading device pushes the articles, separating from the bridge.

6 Claims, 13 Drawing Sheets

(56) References Cited

U.S. PATENT DOCUMENTS

2016/0362254 A1* 12/2016 Papsdorf ............... B65B 59/001
2017/0066606 A1* 3/2017 Hernandez Valverde ...................
                                                              B65B 43/59
2020/0156882 A1* 5/2020 Berger ................. B65G 47/265

FOREIGN PATENT DOCUMENTS

| JP | H04-58518 U | 5/1992 |
|----|----|----|
| JP | H04-115817 U | 10/1992 |
| JP | H06-24567 U | 10/1992 |
| JP | 2001-097547 A | 4/2001 |
| JP | 2010-006555 A | 1/2010 |
| JP | 2013-220870 A | 10/2013 |
| JP | 2016-539060 A | 12/2016 |
| WO | 2015/082563 A1 | 6/2015 |

* cited by examiner

TRANSPORT DEVICE

This application is a National Stage entry under 35 U.S.C. 371 of International Patent Application No. PCT/JP2018/015618, filed on Apr. 13, 2018, the entire contents of which are incorporated by reference herein.

TECHNICAL FIELD

The present invention relates to a transport device.

BACKGROUND ART

For example, when manufacturing products such as pharmaceutical products and food products, containers may be stored in an oven to apply temperature treatment or pressure treatment, such as freeze-drying treatment, to contents in the containers. Typically, in the oven, a number of containers are arranged in an arrayed pattern. Therefore, when temperature distribution or pressure distribution in the oven is fluctuated, processing conditions of the contents in the containers are also fluctuated due to arrangement in the oven, so that a quality of the contents after the processing may be fluctuated. Therefore, when sampling a content in the containers after the processing for inspection, it is preferable that where in the oven the sampled container is disposed in the oven can be traced. Here, when the containers arranged in the oven are transported by row, it is possible to trace the position where the sampled container was disposed, such as which row and the position from the side in the oven.

Patent Literature 1 proposes a method of transferring a row of containers onto a conveyor by inserting a thin sheet from a conveyor side under a row of containers closest to the conveyor among a plurality of the containers arranged on a plate and pulling the sheet.

Patent Literature 2 proposes a method of fixing a row of containers adjacent to the row of containers pushed out onto a conveyor on a plate by a suction device to prevent the containers in the adjacent row from being pulled out and mixed into the row of containers pushed out onto the conveyor when the containers are discharged by pushing out from an oven via the plate onto the conveyor.

Patent Literature 3 proposes a method of pushing a row of containers from a plurality of the containers arranged on a plate onto a conveyor, and then moving the plate with the containers arranged thereon upward or moving the conveyor downward to prevent containers on the plate from coming into contact with the conveyor.

CITATION LIST

Patent Literature

PTL 1: EP1717533B
PTL 2: WO2015/082563A
PTL 3: US2009/208320A

SUMMARY OF INVENTION

Technical Problem

In a method disclosed in Patent literature 1, when a sheet is inserted under containers, the containers may fall over. In addition, movement of the containers in association with the movement of the sheet is unstable because it depends on a frictional force applied between the sheet and the containers. In addition, for example, when guides for restricting the direction of movement of rows of the containers are provided on both end sides of the row of containers, if the frictional force applied between the containers and the guides is larger than the frictional force applied between the sheet and the containers, the containers cannot move. In addition, since a large apparatus for driving the sheet is disposed before a conveyor, the large apparatus for driving the sheet may be an obstacle for cleaning and maintenance.

In an oven, in order to store as many containers as possible, the containers may be arranged in a staggered manner, and recessed spaces between the containers in one container row may receive parts of the containers in an adjacent row when viewed from above. Therefore, with methods disclosed in Patent Literatures 2 and 3, when a row of the containers pushed out onto a conveyor is carried by the conveyor, the containers on the conveyor may fall over due to a contact with the containers positioned before the conveyor, or the containers in an adjacent row are mixed into the row of containers pushed out onto the conveyor by being pulled out, so that the position of each container in the oven may not be able to be traced.

Not only for steps of manufacturing pharmaceutical products or food products, a technology which enables transport of a plurality of articles to a conveyor by row is desired. Accordingly, it is one of objects of the present invention to provide a transport device capable of transporting the articles onto a conveyor by row.

Solution to Problem

According to an aspect of the present invention, there is provided a transport device including: a support configured to allow a plurality of articles to be arranged on top; a discharging device configured to push the plurality of articles arranged on the support; and a conveyor belt configured to transport a row of the articles pushed out from the support, in which after the predetermined row of articles are pushed out from the support onto the conveyor belt, the conveyor belt moves in a direction identical to a direction in which a discharging device pushes the articles, and are positioned apart from the support.

In the transport device described above, the conveyor belt may move so that the row of the articles arranged on the conveyor belt are positioned apart from the articles arranged on the support.

In the transport device described above, the plurality of articles may be arranged on the support in a staggered manner.

The transport device described above may include a belt slider configured to move the conveyor belt in an identical direction to a direction in which the discharging device pushes the articles, and to position the conveyor belt apart from the support after the predetermined row of articles are pushed out from the support onto the conveyor belt.

In the transport device described above, the belt slider may have a contact part that comes into contact with an underside surface structure of the conveyor belt, and the conveyor belt may be positioned apart from the support by the contact part of the belt slider pushing the underside surface structure of the conveyor belt.

In the transport device described above, the underside surface structure of the conveyor belt is a protrusion, and the conveyor belt may be separated from the support by pushing the protrusion on an underside surface of the conveyor belt by the contact part of the belt slider.

The transport device described above may further include an eccentric cam for moving the belt slider.

The transport device described above may further include a gear configured to guide the position of the conveyor belt and the conveyor belt may be moved by moving the gear by the belt slider.

The transport device described above may further include a pusher configured to push back the articles toward the support so that only the predetermined row of articles remain on the conveyor belt out of the articles pushed out onto the conveyor belt.

In the transport device described above, the conveyor belt may be made of an elastic material. The conveyor belt may include a chain.

According to the present invention, there is provided an oven system including: an oven; a plate disposed in the oven; a discharging device configured to push a plurality of the articles arranged on the plate; a bridge disposed adjacent to the plate; and a conveyor belt disposed adjacent to the bridge for transporting the row of the articles pushed out from the plate, in which after the predetermined row of articles are pushed out from the bridge onto the conveyor belt, the conveyor belt moves in an identical direction to a direction in which the discharging device pushes the articles, and are positioned apart from the bridge.

In the oven system described above, the conveyor belt may move so that the row of the articles arranged on the conveyor belt are positioned apart from the articles arranged on the bridge.

In the oven system descried above, a plurality of the articles may be arranged in a staggered manner on the plate.

The oven system described above may further include a belt slider configured to move the conveyor belt in an identical direction to a direction in which the discharging device pushes the articles to position the conveyor belt apart from the bridge after the predetermined row of articles are pushed out from the bridge onto the conveyor belt.

In the oven system described above, the belt slider may have the contact part that comes into contact with an underside surface structure of the conveyor belt, and the conveyor belt may be positioned apart from the bridge by the contact part of the belt slider pushing the underside surface structure of the conveyor belt.

In the oven system described above, the underside surface structure of the conveyor belt is a protrusion, and the conveyor belt may be separated from the bridge by pushing the protrusion on an underside surface of the conveyor belt by the contact part of the belt slider.

The oven system described above may further include an eccentric cam for moving the belt slider.

The oven system described above may further include a gear configured to guide a position of the conveyor belt and the conveyor belt may be moved by moving the gear by the belt slider.

The above-described oven system may further include a pusher configured to push back the articles toward the bridge so that only the predetermined row of articles remain on the conveyor belt out of the articles pushed out onto the conveyor belt.

In the oven system described above, the conveyor belt may be an elastic body. The conveyor belt may include a chain.

Advantageous Effects of Invention

According to the present invention, the transport device capable of transporting the articles to the conveyor by row may be provided.

DESCRIPTION OF EMBODIMENTS

An embodiment of the present invention will be described below. In the drawings, the same or similar parts are designated by the same or similar reference signs. However, the drawings are schematic illustrations. Therefore, specific dimensions or the like are to be determined based on the following description. In addition, the drawings may include parts having different dimensional relationships and ratios from each other as a matter of course.

First Embodiment

Figure 1:
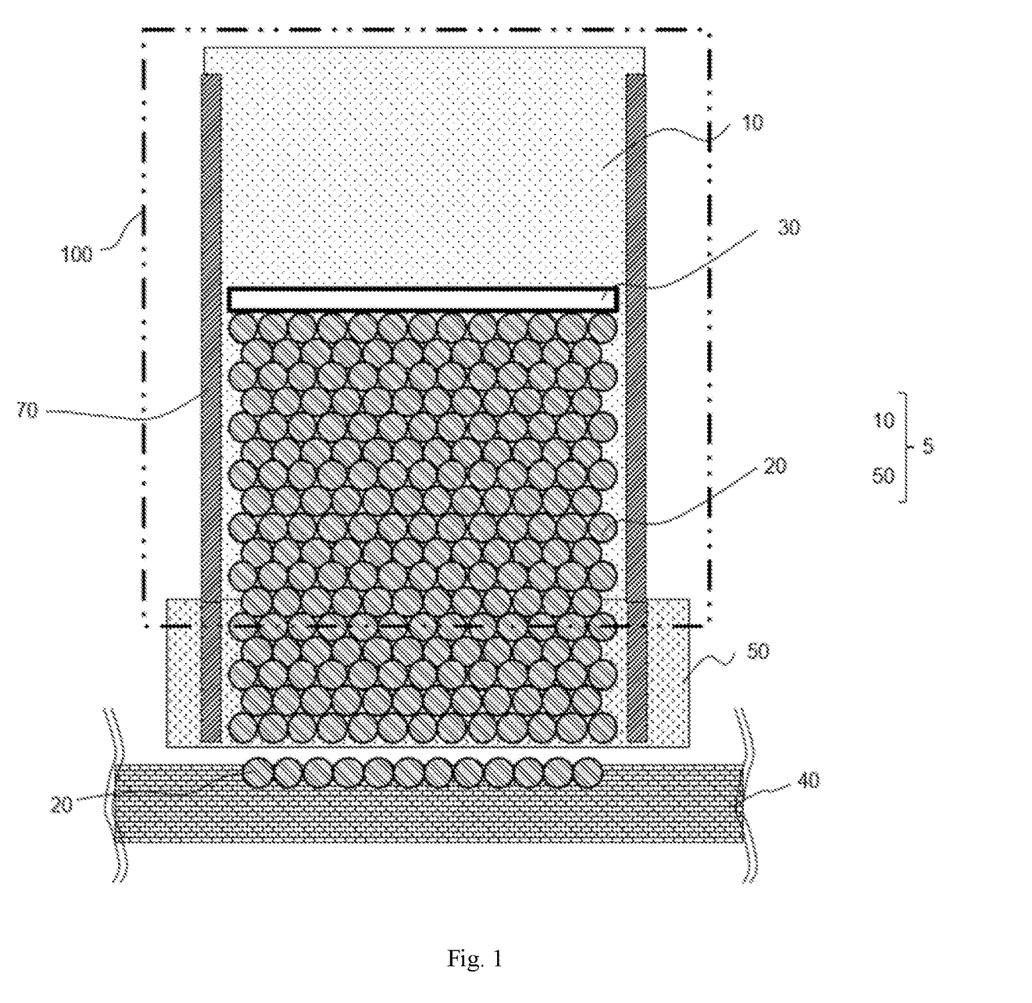
FIG. 1 is a schematic top view of a transport device according to a first embodiment.

A transport device according to a first embodiment includes, as illustrated in FIG. 1, a support 5 configured to allow a plurality of articles 20 to be arranged on top; a discharging device 30 configured to push the plurality of articles 20 arranged on the support 5; and a conveyor belt 40 configured to transport a row of the articles 20 pushed out from the support 5. In the transport device according to the first embodiment, after a predetermined row of the articles 20 is pushed out from a bridge 50 to the conveyor belt 40, the conveyor belt 40 moves in an identical direction to a direction in which the discharging device 30 pushes the articles 20, and is positioned apart from the support 5. The conveyor belt 40 is moved so that the row of the articles 20 arranged on the conveyor belt 40 are positioned apart from the articles 20 arranged on the support 5.

Figure 2:
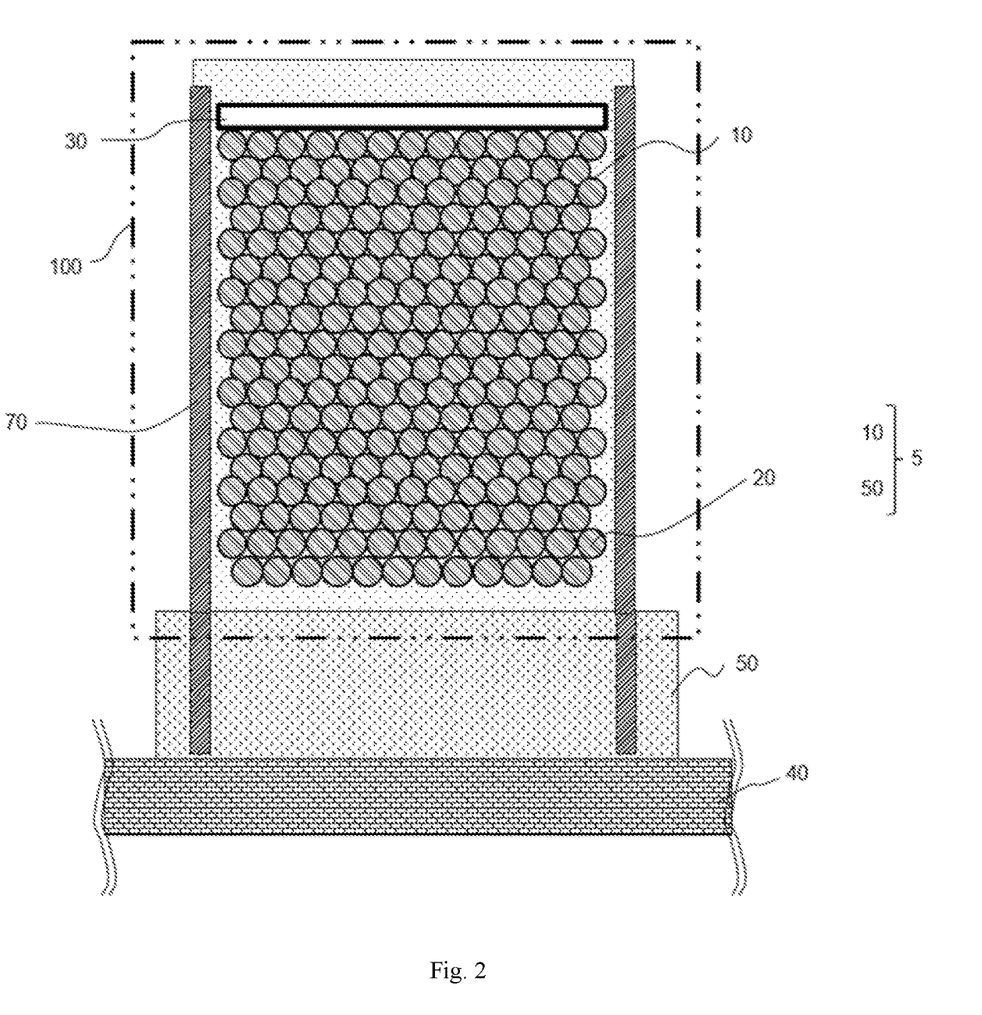
FIG. 2 is a schematic top view of the transport device according to the first embodiment.

The support 5 includes, as illustrated in FIG. 2, a plate 10 disposed in a closed space 100, and the bridge 50 of which at least a part is disposed out of the closed space 100. The bridge 50 is disposed between the plate 10 and the conveyor belt 40. The closed space 100 may be provided, for example, by an oven, a tank, a storage room, and the like. In the closed space 100, at least one of a temperature and a pressure may be controlled. In the closed space 100, at least one of temperature distribution and pressure distribution may be controlled. The oven may be a freeze dry oven. The closed space 100 may be released by a door or the like.

Each of the plurality of articles 20 is, but not specifically limited to, a container, such as a vial, that stores pharmaceutical products to be subject, for example, to treatment such as freeze drying. Each of the plurality of articles 20 includes, for example, a cylindrical shape. The plurality of articles 20 are arranged in a staggered manner (staggered arrangement) such that a larger number of articles 20 can be arranged on the plate 10. Therefore, the plurality of articles 20 are arranged in an overlapped manner when viewed from a side of a direction of travel of the discharging device 30. The plurality of articles 20 are arranged such that centers are alternating with each other by row extending substantially parallel to the conveyor belt 40 when viewed from above.

For example, the respective centers of the articles 20 in a second row are shifted with respect to the respective centers of the articles 20 in a first row on a conveyor belt 40 side in the direction of the row. However, the respective centers of the articles 20 in a third row are not generally shifted with respect to the respective centers of the articles 20 in the first row in the direction of the row. The centers of the plurality of articles 20 may be recognized as being arranged at intersections of a triangle grid pattern. However, in this disclosure, a triangle forming the triangle grid pattern may be, and may not be a regular triangle.

Figure 3:
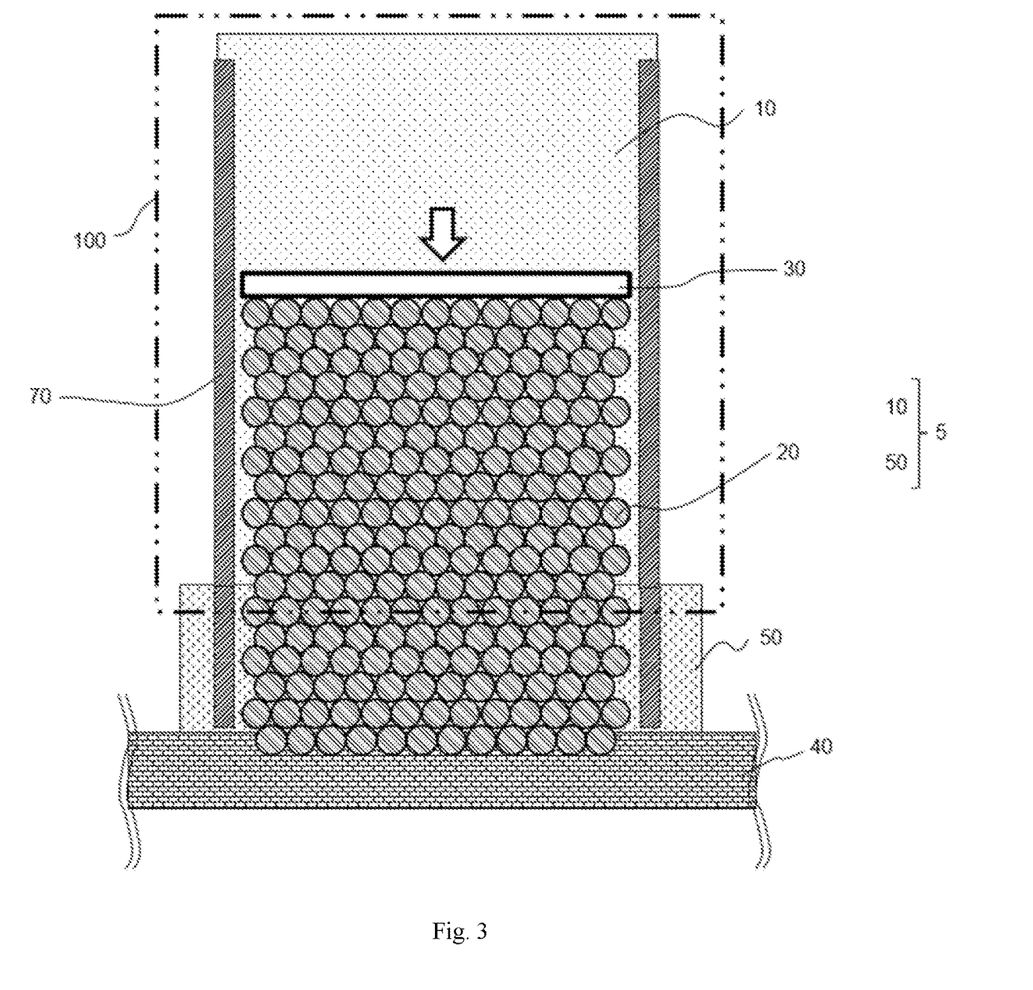
FIG. 3 is a schematic top view of the transport device according to the first embodiment.

When the plurality of articles 20 are taken out from the closed space 100, the door of the oven, or the like, that provides the closed space 100 is opened, and the discharging device 30 pushes out the plurality of articles 20 on the plate 10 toward the conveyor belt 40 via the bridge 50, as illustrated in FIG. 3. The discharging device 30 has, for example, a shape capable of coming into contact with an innermost row of the plurality of articles 20 in the closed space 100. In other words, the discharging device 30 has a shape capable of coming into contact with the row of the articles 20 on a side opposite from the conveyor belt 40 among the plurality of articles 20 on the plate 10. The shape of the discharging device 30 is, for example, a bar. The direction of travel of the discharging device 30 is, for example, parallel to upper surfaces of the plate 10 and the bridge 50, and perpendicular to the direction of transport of the conveyor belt 40. A guide 70 may be provided in a vicinity of the plate 10 and the bridge 50 to prevent the articles 20 pushed by the discharging device 30 from spreading laterally with respect to the direction of travel of the discharging device 30.

While the discharging device 30 pushes the articles 20 toward the conveyor belt 40, the conveyor belt 40 is positioned in a proximity of the bridge 50. During this period, a space may be present between the conveyor belt 40 and the bridge 50 to an extent that does not allow the articles 20 to drop. A height of the conveyor belt 40 and a height of the bridge 50 are adjusted so that the articles 20 do not fall down. After a predetermined row, for example, a row of the articles 20 are pushed onto the conveyor belt 40, the discharging device 30 stops. Note that the predetermined number of rows may be a plurality of, that is, two or more rows.

Figure 4:
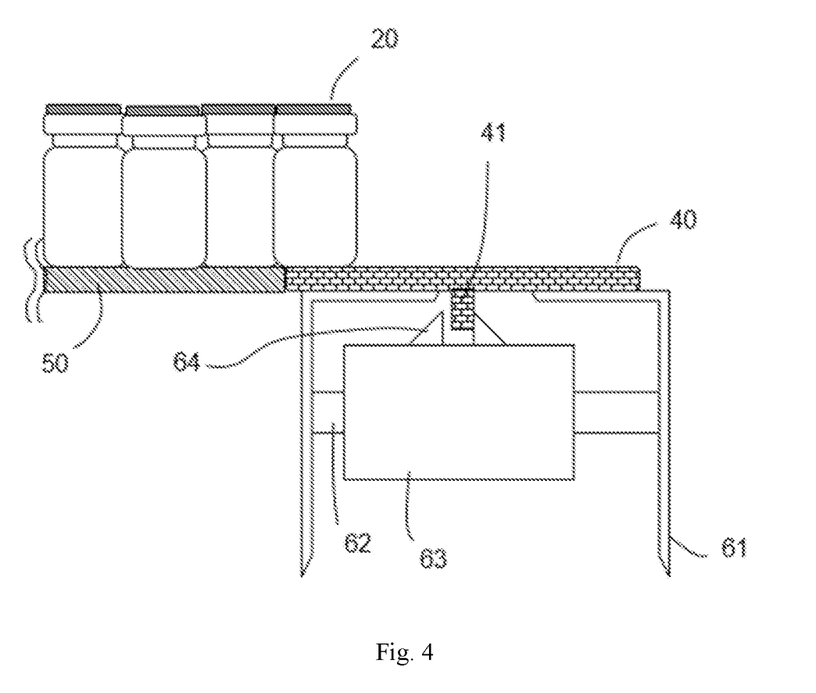
FIG. 4 is a schematic side view of the transport device according to the first embodiment.

As illustrated in FIG. 4, a housing 61 is disposed below the conveyor belt 40. A belt slider 63 is disposed in the housing 61 to move, after the predetermined row of the articles 20 have been pushed out from the bridge 50 onto the conveyor belt 40, the conveyor belt 40 in the discharging direction of the discharging device 30 and to position the conveyor belt 40 apart from the bridge 50. A rail 62 is disposed in an interior of the housing 61. The belt slider 63 is movable along the rail 62. The belt slider 63 includes a contact part 64 capable of coming into contact with an underside surface structure 41 of the conveyor belt 40.

The underside surface structure 41 of the conveyor belt 40 may be a protrusion or a recess. An opening for exposing the underside surface structure 41 of the conveyor belt 40 is provided on an upper surface of the housing 61. Alternatively, the upper surface of the housing 61 may be eliminated. The rail 62 is disposed in parallel to an underside surface of the conveyor belt 40 and perpendicular to the direction of transport of the conveyor belt 40. Therefore, the rail 62 is disposed parallel to the direction of travel of the discharging device 30 illustrated in FIG. 3.

Figure 5:
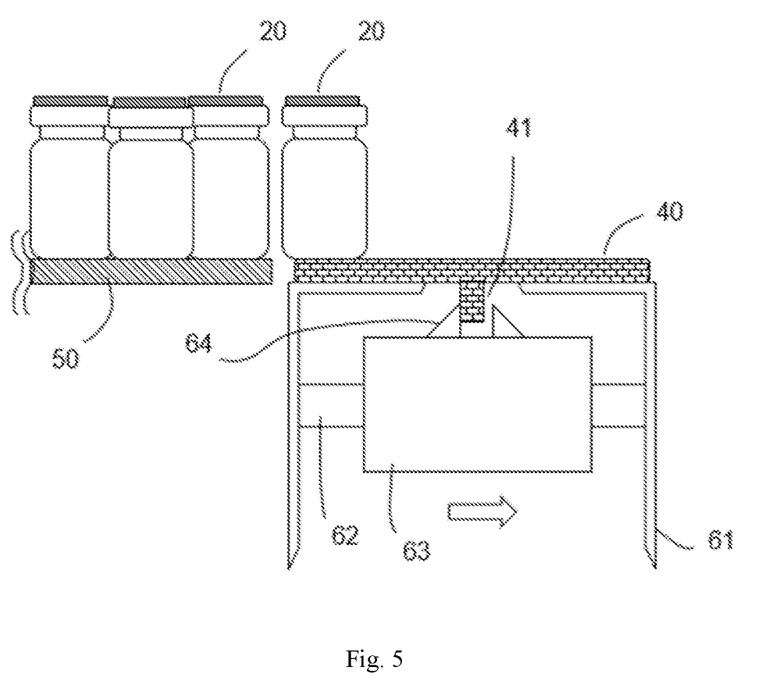
FIG. 5 is a schematic side view of the transport device according to the first embodiment.

The contact part 64 of the belt slider 63 illustrated in FIG. 4 may be a guide, such as a protrusion, provided on the belt slider 63 or may be a side surface of the belt slider 63. The belt slider 63 is, for example, self-propelled along the rail 62. As illustrated in FIG. 5, when the belt slider 63 moves in a direction away from the bridge 50 along the rail 62, the contact part 64 of the belt slider 63 comes into contact with a side surface of the underside surface structure 41 of the conveyor belt 40, and pushes the side surface of the underside surface structure 41. Accordingly, the conveyor belt 40 is pushed in the direction away from the bridge 50 and the conveyor belt 40 is positioned apart from the bridge 50. Therefore, as illustrated in FIG. 1, the row of the articles 20 on the conveyor belt 40 is positioned apart from the row of the articles 20 on the bridge 50. Note that when the conveyor belt 40 is made of an elastic material, the conveyor belt 40 pushed by the belt slider 63 may be elastically deformed within a plane. When the conveyor belt 40 includes a chain, a mesh, a slat, or the like, the conveyor belt 40 may be deformed within a plane by a decrease or an increase of distances among these components of the conveyor belt 40 pushed by the belt slider 63.

Figure 6:
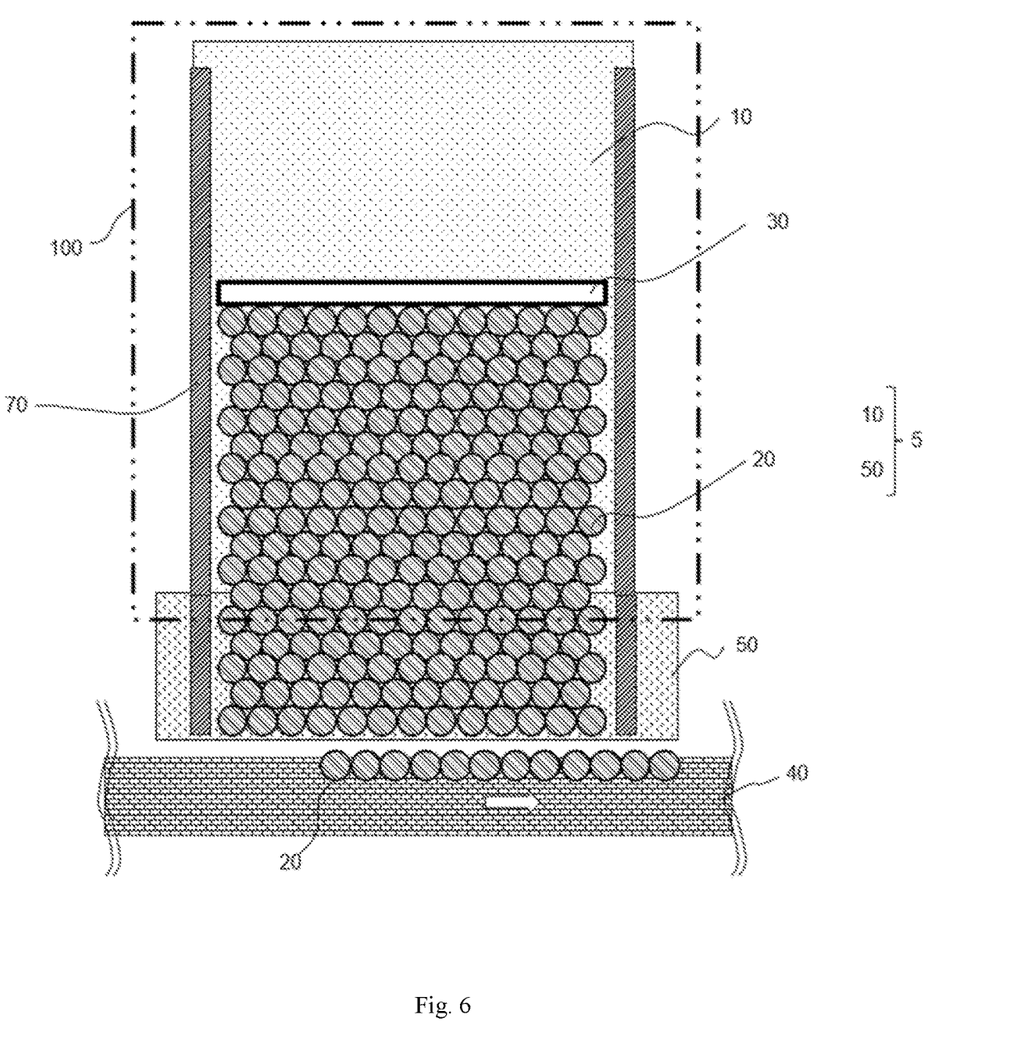
FIG. 6 is a schematic top view of the transport device according to the first embodiment.

As illustrated in FIG. 6, in a state in which the conveyor belt 40 is positioned apart from the bridge 50, the conveyor belt 40 is driven, and the row of the articles 20 on the conveyor belt 40 is transported by the conveyor belt 40. After the row of the articles 20 on the conveyor belt 40 is transported, the belt slider 63 moves toward the bridge 50 along rail 62, and the conveyor belt 40 moves to a position proximal to the bridge 50 again.

Figure 7:
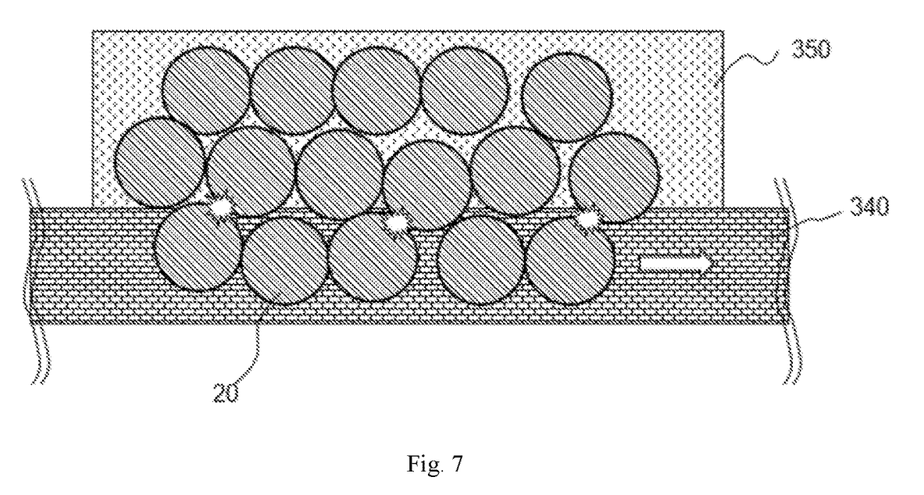
FIG. 7 is a schematic top view of a transport device according to a reference example.

Here, as illustrated in FIG. 7, if a conveyor belt 340 is supposed to be driven without being positioned apart from a bridge 350, the row of the articles 20 transported on the conveyor belt 340 come into contact with the articles 20 on the bridge 350, so that the articles 20 on the conveyor belt 340 may be fallen over. In addition, the articles 20 on the bridge 350 may be fallen over and mixed onto the conveyor belt 340, so that additional other articles 20 may be fallen over.

In contrast, according to the transport device of the first embodiment, even when the plurality of the articles 20 are arranged in a staggered manner on the plate 10 illustrated in FIG. 1, the row of the articles 20 transported by the conveyor belt 40 are reliably positioned apart from the row of the articles 20 on the bridge 50, which are to be transported by the conveyor belt 40 a next time, so that the row of the articles 20 transported by the conveyor belt 40 do not come into contact with the row of the articles 20 to be transported by the conveyor belt 40 a next time. Therefore, the articles 20 transported by the conveyor belt 40 a next time are not pulled out and mixed into the row of the articles 20 being transported by the conveyor belt 40 and the articles 20 do not fall over. Therefore, when sampling one or more of the articles 20 transported by the conveyor belt 40, where on the plate 10 the sampled article(s) 20 has (have) been positioned may be traced.

In the first embodiment, as illustrated in FIG. 4, the belt slider 63 is disposed in the housing 61 positioned below the conveyor belt 40. Therefore, installation does not require a space, so that impedance of the workability of the operators around the conveyor belt 40 may be prevented.

Second Embodiment

Figure 8:
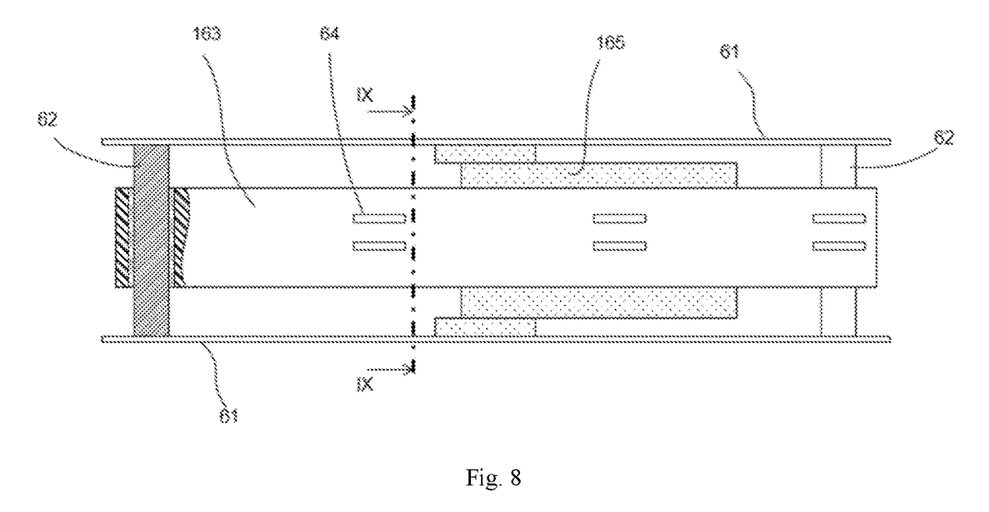
FIG. 8 is a schematic top view of a transport device according to a second embodiment.
Figure 9:
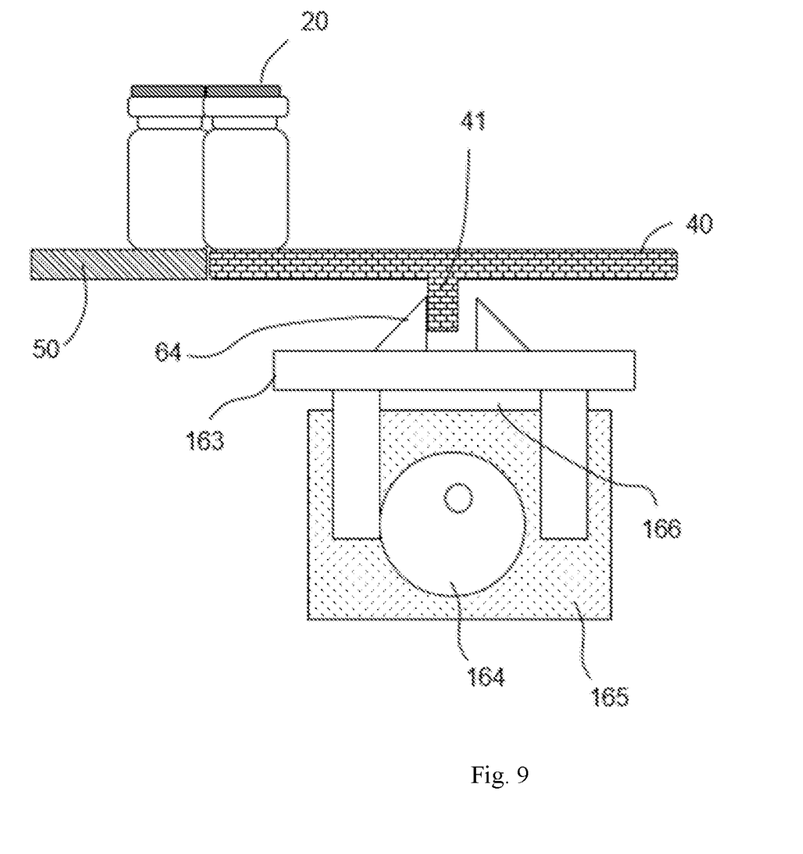
FIG. 9 is a schematic side view of the transport device according to the second embodiment.

A top view of a transport device according to a second embodiment is the same as the transport device according to the first embodiment illustrated in FIG. 1. The transport device according to the second embodiment includes an eccentric cam 164 configured to move a passive belt slider 163, as illustrated in FIG. 8 and FIG. 9. The eccentric cam 164 is rotated by a rotating device 165 such as a motor. A plane of rotation of the eccentric cam 164 is parallel to a direction of travel of discharging device 30. A recess 166 is provided at a bottom portion of the belt slider 163, and the eccentric cam 164 rotates in the recess 166 of the belt slider 163.

Figure 10:
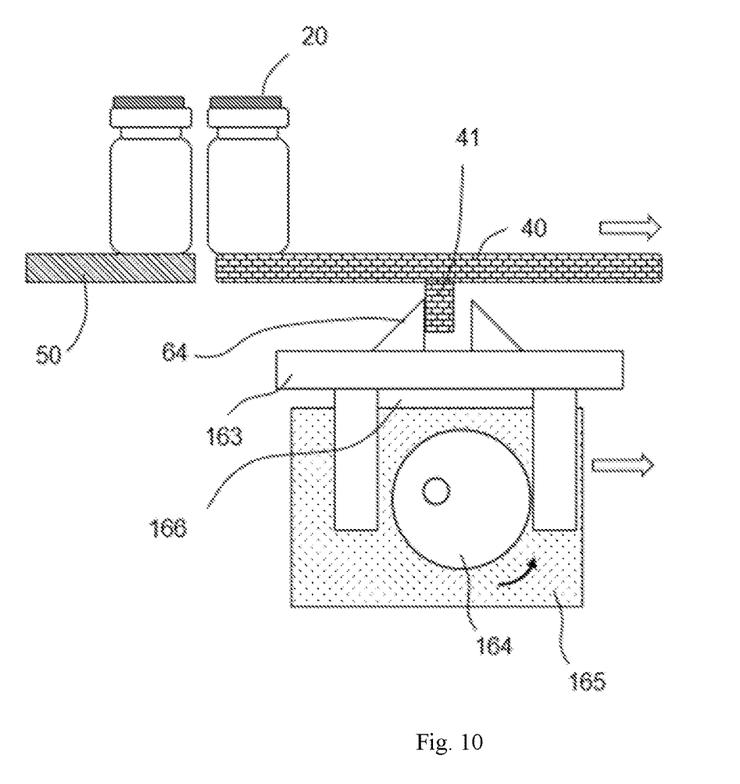
FIG. 10 is a schematic side view of the transport device according to the second embodiment.

As illustrated in FIG. 10, when the eccentric cam 164 rotates in a certain direction, the eccentric cam 164 comes into contact with a part of an inner wall of the recess 166 on a far side from bridge 50 and pushes the inner wall. Accordingly, the belt slider 163 is pushed in a direction away from the bridge 50. A contact part 64 of the belt slider 163 comes into contact with a side surface of an underside surface structure 41 of conveyor belt 40 and pushes the side surface of the underside surface structure 41. Therefore, the conveyor belt 40 is pushed in a direction away from the bridge 50 and the conveyor belt 40 is positioned apart from the bridge 50.

After the row of the articles 20 on the conveyor belt 40 are transported, the eccentric cam 164 rotates in the opposite direction, the belt slider 163 moves toward the bridge 50 along a rail 62, and the conveyor belt 40 moves to a position proximal to the bridge 50 again. Other components of the transport device according to the second embodiment may be the same as those in the first embodiment.

Third Embodiment

Figure 11:
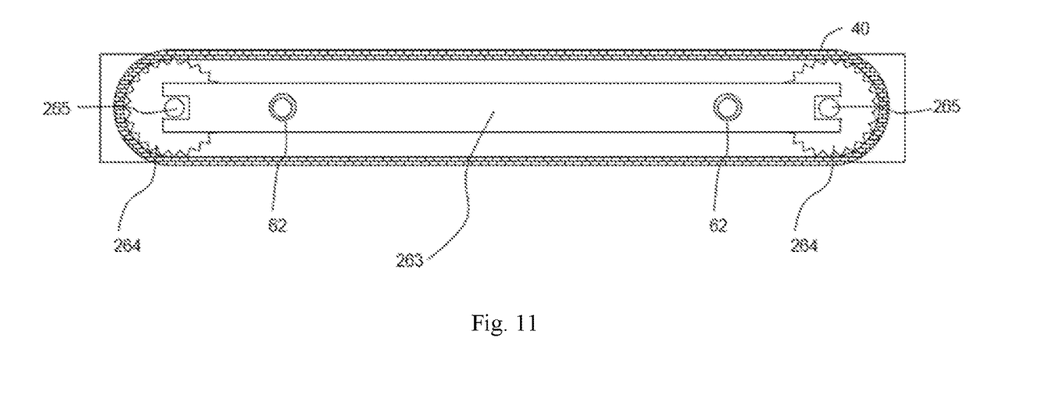
FIG. 11 is a schematic front view of a transport device according to a third embodiment.
Figure 12:
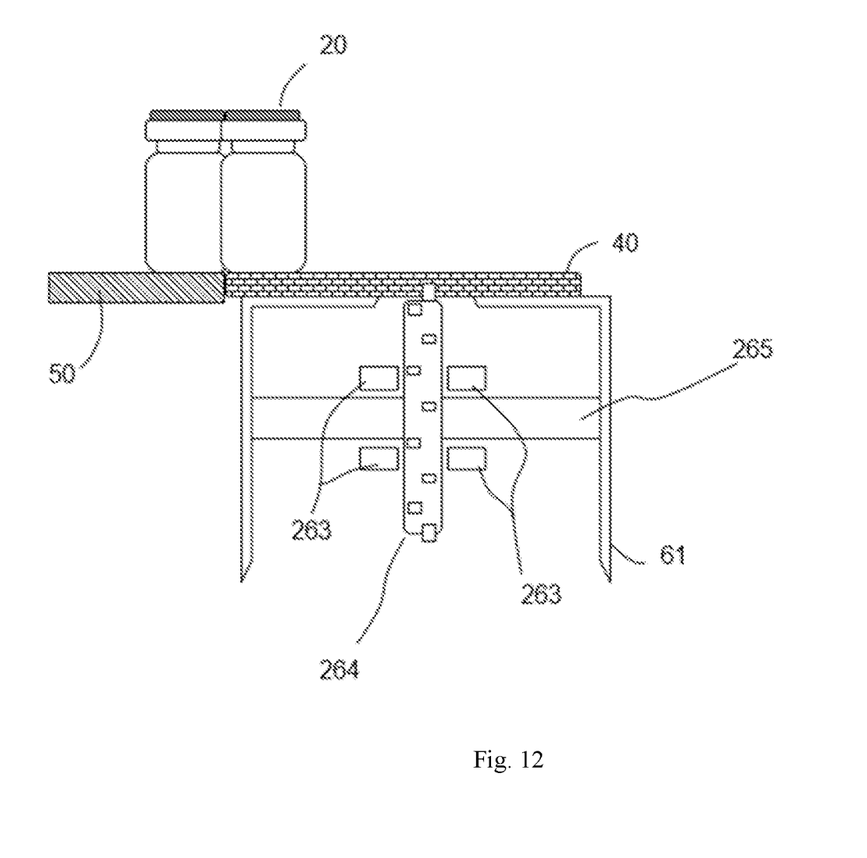
FIG. 12 is a schematic side view of the transport device according to the third embodiment.

A top view of a transport device according to a third embodiment is the same as the transport device according to the first embodiment illustrated in FIG. 1. The transport device according to the third embodiment further includes gears 264 configured to guide a position of a conveyor belt 40, as illustrated in FIG. 11. Examples of the gears 264 include a drive sprocket and a driven sprocket. The gears 264 fit an underside surface structure of the conveyor belt 40. The underside surface structure of the conveyor belt 40 may have a structure engaging the gears 264. As illustrated in FIG. 12, the gears 264 are retained by shafts 265 disposed in a housing 61. The shafts 265 are disposed in parallel to an underside surface of the conveyor belt 40 and perpendicular to a direction of transport of the conveyor belt 40. Therefore, the shafts 265 are disposed parallel to a direction of travel of a discharging device 30.

Figure 13:
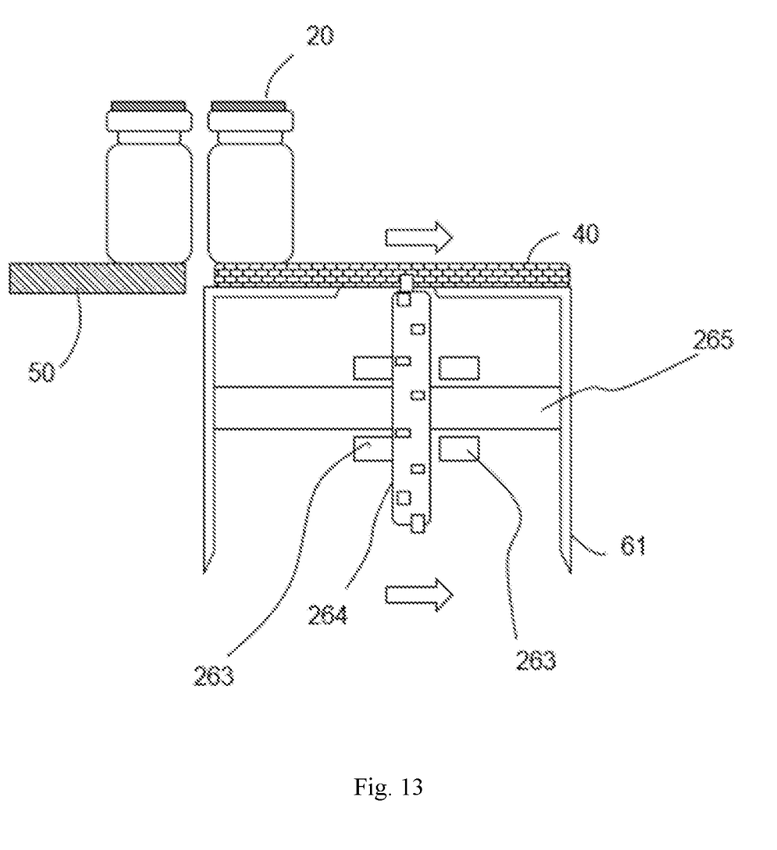
FIG. 13 is a schematic side view of the transport device according to the third embodiment.

In the third embodiment, belt sliders 263 have a structure interposing the gears 264. Therefore, as illustrated in FIG. 13, the belt sliders 163 move in a direction away from the bridge 50 along the rail 62, the belt sliders 163 come into contact with side surfaces of the gears 264 and push the gears 264. Accordingly, the gears 264 are pushed in the direction away from the bridge 50. Furthermore, the conveyor belt 40 guided by the gears 264 is pushed in the direction away from the bridge 50 and the conveyor belt 40 is positioned apart from the bridge 50.

After the row of the articles 20 on the conveyor belt 40 are transported, the belt sliders 263 move along the rail 62 toward the bridge 50 and push the gears 264 toward the bridge 50. Accordingly, the conveyor belt 40 moves to the position proximal to the bridge 50 again. Other components of the transport device according to the third embodiment may be the same as those in the first embodiment.

Fourth Embodiment

Figure 14:
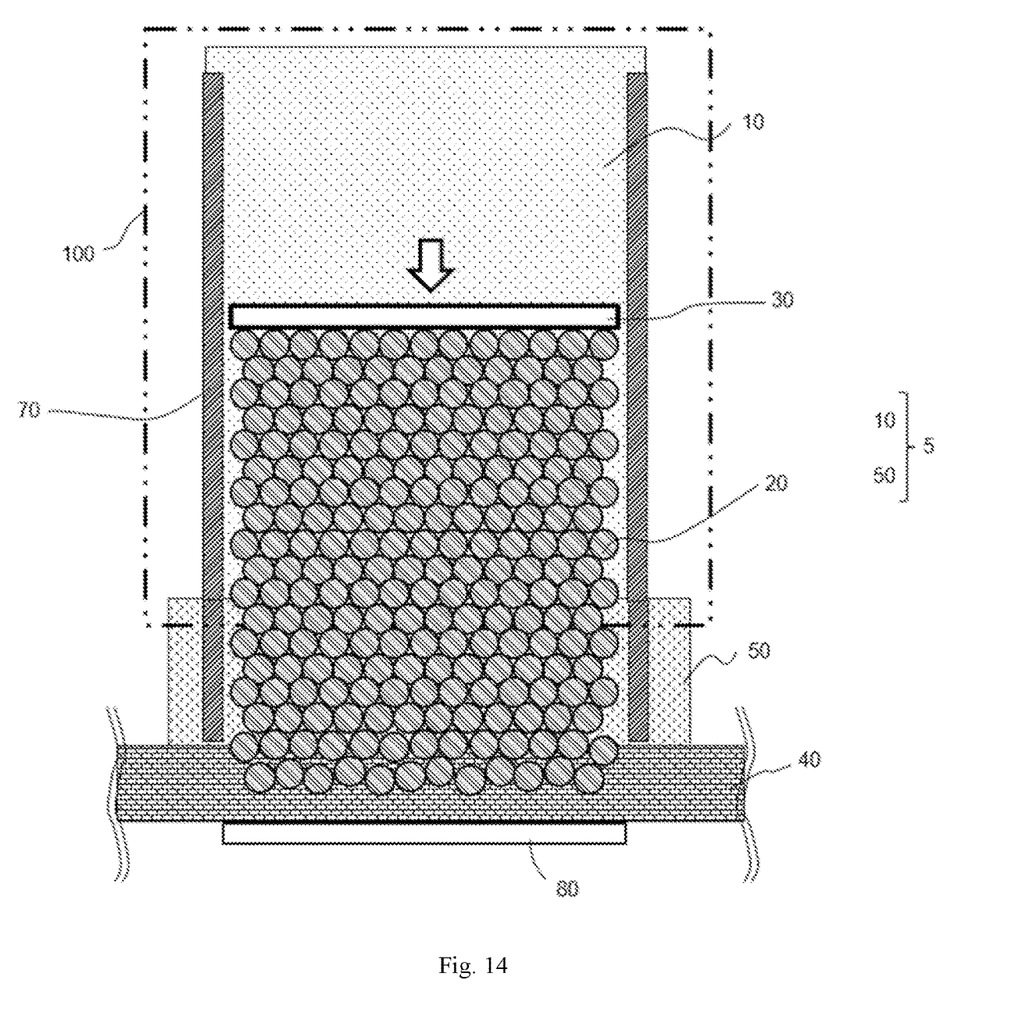
FIG. 14 is a schematic top view of a transport device according to a fourth embodiment.
Figure 15:
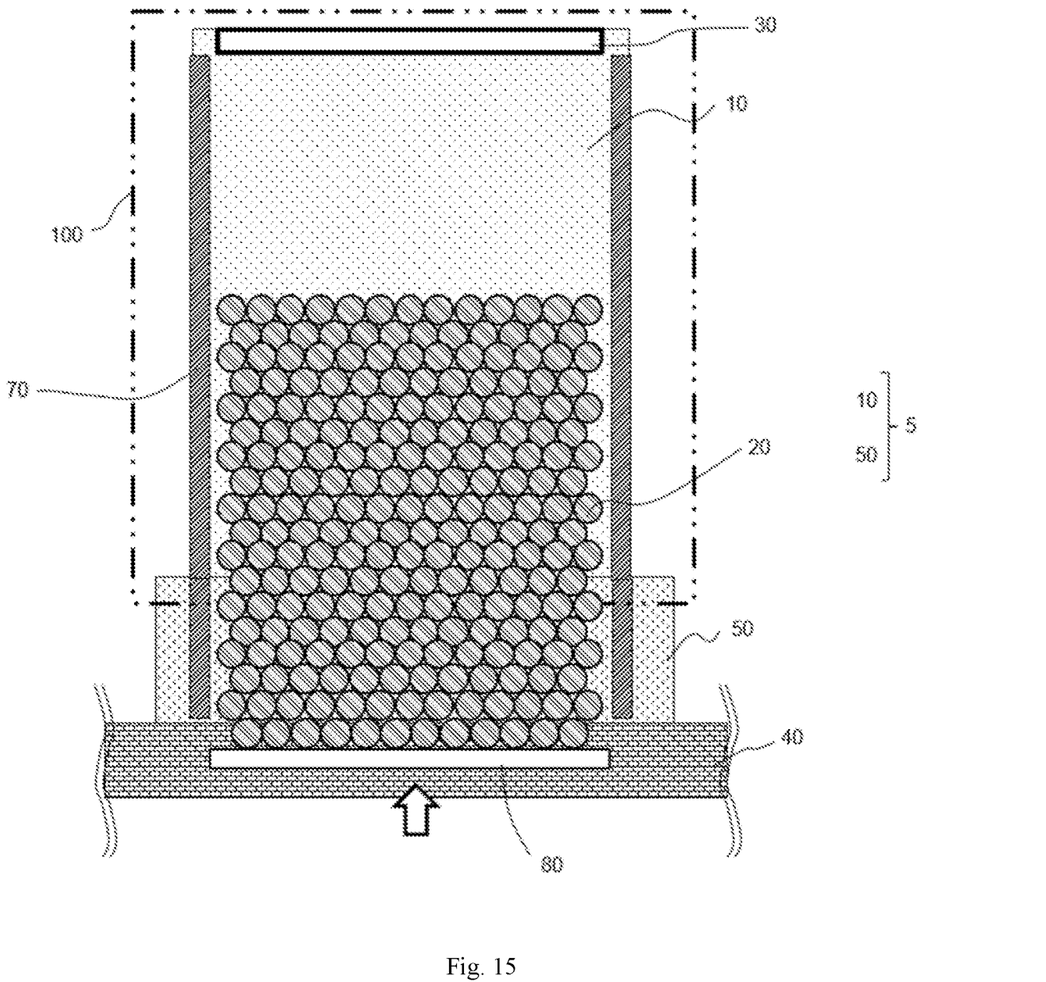
FIG. 15 is a schematic top view of the transport device according to the fourth embodiment.

For the transport device according to the fourth embodiment, as illustrated in FIG. 14 and FIG. 15, a pusher 80 configured to push back the articles 20 pushed out onto the conveyor belt 40 is further provided. The pusher 80 has a flat contact surface that comes into contact with the side surfaces of the articles 20. As illustrated in FIG. 14, the positions of the rows of the articles 20 pushed by the discharging device 30 may be varied in the direction of travel of the discharging device 30. In such a case, part of the articles 20 to be arranged on the conveyor belt 40 may remain on the bridge 50.

Therefore, in the transport device according to the fourth embodiment, even when the arrangement of the articles 20 in the rows varies, the discharging device 30 pushes the articles 20 until at least part of the articles 20 to be transported by the conveyor belt 40 a next time are also placed on the conveyor 40 so that the row of the articles 20 to be transported by the conveyor belt 40 is completely arranged on the conveyor belt 40. Subsequently, as illustrated in FIG. 15, the pusher 80 pushes the articles 20 back toward the bridge 50 so that only the predetermined row of the articles 20 remain on the conveyor belt 40 out of the articles 20 pushed out onto the conveyor belt 40. Subsequently, the conveyor belt 40 is positioned apart from the bridge 50, and the articles 20 on the conveyor belt 40 are transported.

According to the transport device of the fourth embodiment, even then the positions of the rows of the articles pushed out onto the conveyor belt 40 are varied, the variations in the positions of the rows may be canceled by pushing the rows of articles 20 pushed out onto the conveyor belt 40 by the pusher 80. In addition, the articles 20 to be transported may be arranged on the suitable positions on the conveyor belt 40.

OTHER EMBODIMENTS

Although the present invention has been described based on the embodiments, description and drawings which constitute part of this disclosure should not be interpreted to limit the present invention. From this disclosure, various alternative embodiments, examples, and operational technologies will become apparent for those skilled in the art. For example, articles to be transported in or out of an oven are not limited to those including pharmaceutical products, but may be articles such as food products, beverages, and precision parts, and may include any articles. The oven is not limited to the freeze dry oven, and may be a fermentation oven, or any oven which requires restraint of unevenness in temperature distribution or restraint of generation of dust in the interior. In this manner, it should be understood that the present invention includes various embodiments which are not described in this specification.

REFERENCE SIGNS LIST

5 . . . support, 10 . . . plate, 20 . . . article, 30 . . . discharging device, 40 . . . conveyor belt, 41 . . . underside surface structure, 50 . . . bridge, 61 . . . housing, 62 . . . rail, 63 . . . belt slider, 64 . . . contact part, 70 . . . guide, 80 . . . pusher, 100 . . . closed space, 163 . . . belt slider, 164 . . . eccentric cam, 165 . . . rotating device, 166 . . . recess, 263 . . . belt slider, 264 . . . gear, 265 . . . shaft, 340 . . . conveyor belt, 350 . . . bridge

The invention claimed is:

1. A transport device comprising:
a support configured to allow a plurality of articles to be arranged on top;
a discharging device configured to push the plurality of articles arranged on the support; and
a conveyor belt configured to transport a row of the articles pushed out from the support;
the conveyor belt being moved in an identical direction to a direction in which the discharging device pushes the articles after a predetermined row of the articles are pushed out from the support onto the conveyor belt, and being positioned apart from the support,
the transport device further comprising:
a belt slider configured to move the conveyor belt in the identical direction to the direction in which the discharging device pushes the articles after the predetermined row of articles are pushed out from the support onto the conveyor belt, and to position the conveyor belt apart from the support,
wherein the belt slider has a contact part that comes into contact with an underside surface structure of the conveyor belt, and the conveyor belt is positioned apart from the support by the contact part of the belt slider pushing the underside surface structure of the conveyor belt.

2. The transport device according to claim 1, wherein the underside surface structure of the conveyor belt is a protrusion and the conveyor belt is moved away from the support by pushing the protrusion on an underside surface of the conveyor belt by the contact part of the belt slider.

3. The transport device according to claim 1, further comprising an eccentric cam configured to move the belt slider.

4. A transport device comprising:
a support configured to allow a plurality of articles to be arranged on top;
a discharging device configured to push the plurality of articles arranged on the support; and
a conveyor belt configured to transport a row of the articles pushed out from the support,
the conveyor belt being moved in an identical direction to a direction in which the discharging device pushes the articles after a predetermined row of the articles are pushed out from the support onto the conveyor belt, and being positioned apart from the support,
the transport device further comprising:
a belt slider configured to move the conveyor belt in the identical direction to the direction in which the discharging device pushes the articles after the predetermined row of articles are pushed out from the support onto the conveyor belt, and to position the conveyor belt apart from the support, and
a gear configured to guide the position of the conveyor belt,
wherein the conveyor belt is moved by the belt slider moving the gear.

5. The transport device according to claim 4, further comprising an eccentric cam configured to move the belt slider.

6. A transport device comprising:
a support configured to allow a plurality of articles to be arranged on top;
a discharging device configured to push the plurality of articles arranged on the support; and
a conveyor belt configured to transport a row of the articles pushed out from the support,
wherein the discharging device further comprises a pusher configured to push the articles until at least a part of articles to be transported by the conveyor belt a next time are also placed on the conveyor belt and to push back the articles toward the support so that only articles in a predetermined row remain on the conveyor belt out of the articles pushed out onto the conveyor belt, and
the conveyor belt is moved in an identical direction to a direction in which the discharging device pushes the articles after the predetermined row of the articles are remained on the conveyor belt and is positioned apart from the support.

* * * * *